Aug. 6, 1963 — HUGH L. DRYDEN, DEPUTY ADMINISTRATOR OF THE NATIONAL AERONAUTICS AND SPACE ADMINISTRATION — 3,100,294

TIME-DIVISION MULTIPLEXER

Filed Sept. 29, 1961 — 2 Sheets-Sheet 1

3,100,294
TIME-DIVISION MULTIPLEXER

Hugh L. Dryden, deputy administrator of the National Aeronautics and Space Administration, with respect to an invention of John F. Meyer Filed Sept. 29, 1961, Ser. No. 180,330
7 Claims. (Cl. 340—147)

This invention relates to apparatus for time multiplexing of data, and more particularly to improvements therein.

The operation of time multiplexing may be simply described in one aspect as the sequential switching of N input lines to a common output line or the sequential switching of a common input line to N output lines. A considerable number of different arrangements have been devised for effectuating this type of switching. These have included both electrical mechanizations, which employ rotating brush type of switches, relays, which are purely electronic type mechanizations which effectively comprise logical circuitry and/or electronic switches, and a combination of both electric and electronic mechanizations where circuitry and relays are combined to effectuate the desired result.

An object of this invention is to provide apparatus for multiplex type switching which is simpler than the apparatus available heretofore.

Yet another object of this invention is to provide multiplex switching apparatus which is reliable and retains its reliability despite power failures.

Still another object of the present invention is the provision of multiplexing apparatus which is simpler than that provided heretofore, more economical to operate, and which will assume its correct operating sequence within a minimum interval from the time of starting.

These and other objects of this invention may be achieved in an arrangement wherein a plurality of magnetic latching relays are employed in a circuit configuration to effectuate sequential operation of these latching relays. The plurality of latching relays are divided in two groups. Two phase-displaced clock pulses are provided. Circuitry of the relays is arranged so that a latching relay in one group is driven in response to the condition of operation of the latching relays in the other groups and a clock pulse of a particular phase. The latching relays are thus operated from one of their latching conditions to a second one of their latching conditions in sequence.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

When a relatively low number of measurements (per sampling) must be time multiplexed, a rotating brush mechanization becomes inefficient from the standpoint of size, weight, and power consumed on a per measurement basis. Furthermore, the control of the sampling or clock rate must be executed through the power supply. Therefore, external control via some master clock becomes a rather complex problem. The alternative is to let the rotor act as a master clock. This is undesirable because (1) a timing source is inherently inaccurate, (2) a second pole must be allotted per switch to provide a clock output for detection synchronization, and (3) a clock output must also be provided to data uses to assure proper input synchronization when required. If a metal to metal contact switch is desired there are two standard approaches to solving the timing control problem. One is to go to a conventional stepping switch. Here again, size, weight and power are costly on a per measurement basis. The second arrangement is to electronically sequence the D.C. drive of crystal-can type relays. Here a considerable amount of circuitry is required to provide the sequencing function. Conservatively, the circuit required for the sequencing of ten relays using conventional component assembled flip-flops, will require around 150 components. This does not include the relays themselves or any amplification circuitry required to drive them. The result is some inherent unreliability due to the multiplicity of the components.

A magnetic latching relay operates from pulses that transfer the armature from one contact to another. In a multiplexer, there is an obvious advantage in using a latching type relay at low sampling rates. With a pull-in type relay, the average power consumed is independent of the sampling rate. With the latching relay, power is required only at the transfer times, and the average power will reduce with the clock rate. This power advantage at low rates, however, is not the prime reason for cconsidering their use in multiplexer design. Since the relay is a bistable device, it has the inherent binary memory properties of a flip-flop circuit, a ferro-magnetic toroid, or other commonly used two state memory cells. Since much of the circuitry required to sequence the relays consists of logical memory, the possibility of implementing both the sequencing logic and the switch with the relay is quite promising. The result could appreciably reduce the total number of components required for a relay multiplexer when contrasted with electronic sequencing using semi-conductor circuits.

Figure 1:
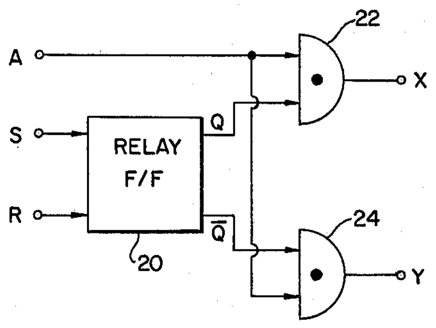
FIGURE 1 is a block schematic diagram of one possible mode of operation of a flip-flop relay in accordance with this invention.
Figure 2:
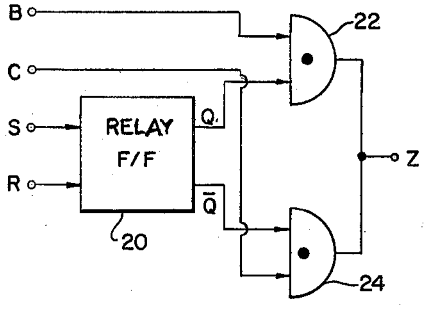
FIGURE 2 is a block schematic diagram of another possible mode of operation of a flip-flop relay in accordance with this invention.

A latching relay circuit is equivalent to the well-known "set-reset" flip-flop circuit or bistable state flip-flop circuit, when the latching relay circuit is combined with certain gating logic. Considering a latching relay to have two poles or to have doublepole double throw type switching, if only one pole of the double pole double throw switch is considered in establishing the logical definition of the circuit to be used herein there are two modes of operation. FIGURE 1 is a block schematic diagram illustrating one possible mode of operation. FIGURE 2 is a block schematic diagram illustrating another possible mode of operation. The relay flip-flop 20 has two inputs, one of them designated by the letter S or set drives the relay flip-flop to one of its stable conditions at which an output may be derived from the output designated as Q. The second input designated by the letter R or reset drives the relay flip-flop to its other stable state and enables an output to be derived from the output designated by $\overline{Q}$. Assume that the signal to be switched, A, is applied to two AND gates respectively 22, 24 to which the respective output Q and $\overline{Q}$ are applied, then employing logical algebra the following may be stated.

$$X=Q.A \text{ and } Y=\overline{Q}.A$$

Here X is the output of the AND gate 22 and Y is the output of the AND gate 24. The respective equations will be recognized as indicating that a signal X is obtained in the presence of signals Q and A, and a signal Y is obtained in the presence of signals $\overline{Q}$ and A.

In FIGURE 2 the set and reset inputs to the relay flip-flop provide the function of enabling outputs to be respectively derived from the Q and $\overline{Q}$ outputs. Here it is desired to switch a plurality of input signals into a common output line. The input signals are respectively designated by B and C and they are respectively applied to the AND gates 22 and 24 to which are also respectively applied the Q and $\overline{Q}$ outputs of the relay flip-flop 20. The output of the two AND gates, designated by Z may be expressed as follows:

$$Z=Q.B+\overline{Q}.C$$

or an output Z is obtained when signals Q and B are present or when signals $\overline{Q}$ and C are present.

Figure 3:
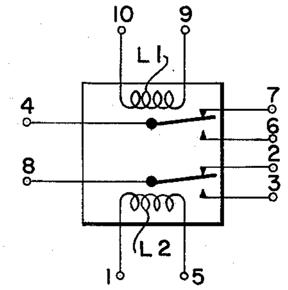
FIGURE 3 is a circuit diagram of a magnetic latching relay.
Figure 4:
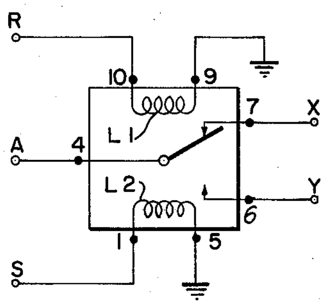
FIGURE 4 is a schematic diagram illustrating the Mode 1 operating condition employing a magnetic latching relay.

The circuitry of a magnetic latching relay may be represented by the schematic shown in FIGURE 3. Such latching relay has a first coil L1 with its ends terminating in terminals 9 and 10 and second coil L2 with its ends terminating terminals 1 and 5. The relay has a set of double pole double throw contacts. Application of a current of one polarity to the coil L1 causes the double pole double throw contacts of the relay to be operated to the condition shown in the drawing wherein a connection is made between external terminals 4 and 7 and external terminals 8 and 2. Application of a current of the same polarity to the coil L2 will cause the double pole double throw contacts to be operated to a position wherein there is connection between external terminals 4 and 6 and external terminals 8 and 3. Effectively, a positive pulse applied to either terminal 1 or terminal 9 (negative on 5 or 10) will operate the relay to the position shown, whereas a negative pulse applied to either terminal 1 or terminal 9 (positive to 5 or 10) will transfer the armature to the opposite contacts. The electrical representation of flip-flop inputs is then as follows: $R=0$ (no pulse), $R=1$ (positive or negative pulse), $S=0$ (no pulse), $S=1$ (positive or negative pulse). Thus, if for example, we define $R=1$ (positive pulse) $S=1$ (positive pulse) the mode I circuit arrangement for a latching relay is shown in FIGURE 4 and corresponds the relay flip-flop arrangement shown in FIGURE 1. The R pulse input is applied to terminal 10 and terminal 9 is connected to ground. The S pulse input is applied to terminal 1 and terminal 5 is connected to ground. The signal A to be successively switched to a plurality of outputs, is applied to terminal 4, and as indicated in the drawing this terminal is connected to either the X or Y output depending upon whether the S or R excitation was last applied.

Figure 5:
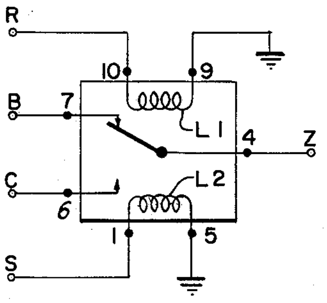
FIGURE 5 is a schematic diagram illustrating the Mode 2 operating condition employing a magnetic latching relay.

The second mode of operation as shown by FIGURES 5 uses the two output terminals 6 and 7 as input terminals. The reset and set inputs are applied to the terminals 10 and 9 and 1 and 5 respectively as before. B and C inputs respectively are connected to terminals 7 and 6 and the Z output is arrived from terminal 4.

It may be seen from the above that the latching relay presents a rather versatile logic block with its equivalent memory and gating functions. Furthermore, the gated inputs are not confined to discrete binary levels as a semiconductor logic. This gives a rather useful degree of freedom to the logical designer.

In interconnecting a plurality of latching relays into a multiplexer system using a simple sequence of clock pulses, satisfactory operation is theoretically but not practically possible. This arises because the relay armature transfer is not instantaneous. With a finite time required to transfer an armature, a relay in the set state will lose its reset excitation as soon as the contact begins to transfer. At normal reset excitation the armature may vibrate as in the doorbell circuit. This vibration is referred to as a hazard in the contact network resulting from the non-ideal operation of the relay. If at all possible the design of the switching circuit should be hazard free. This imposes the limitation on the latching relay mechanization that the logical inputs ($S=1$ or $R=1$) into any relay flip-flop cannot be controlled (gated) by that flip-flop or any other flip-flop changing state at the same bit time. This constraint on the synthesis of the switching network demands either (1) additional logic circuitry or (2) isolation in time of the clocking and gating functions in order to realize hazard free operation.

The first approach requires either additional poles per relay or additional two pole relays in excess of the number required to transfer the data. The second approach requires either a multi-phase clock or some sequence of delayed pulses derived from the input clock. In the interest of a minimum component design, and more specifically a minimum relay configuration a modification of the clocking system seems the better approach.

Figure 6:
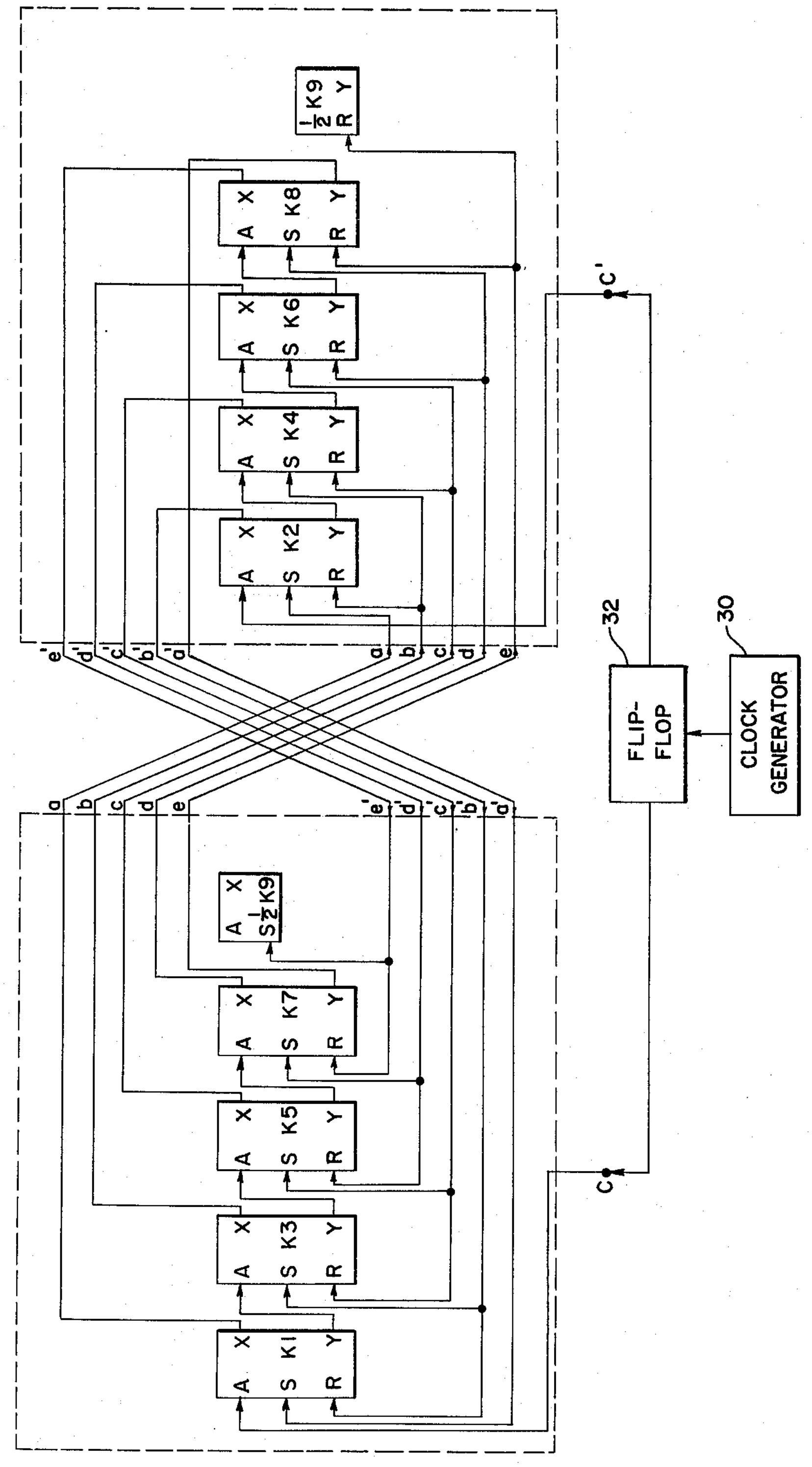
FIGURE 6 is a block diagram of a multiplexer arrangement in accordance with this invention.

Reference is now made to FIGURE 6 which is a block diagram of an arrangement for a multiplexer in accordance with this invention. This includes a plurality of magnetic latching relays respectively represented by the rectangles K1 through K9. The nomenclature used to indicate the inputs and outputs of the relays is identical with that shown in FIGURE 4 where excitation of the R and S inputs respectively connect the A input to the X output or the Y output. The arrow heads indicate the direction of signal flow. The latching relays K1 through K9 are divided into two groups and the last relay, K9, has one half its contacts in one group and the other half in the other group. That is the inputs A and S and the X output of the K9 relay are associated with one of the groups and the R input and Y output of the K9 relay is associated with the other group.

Figure 7:
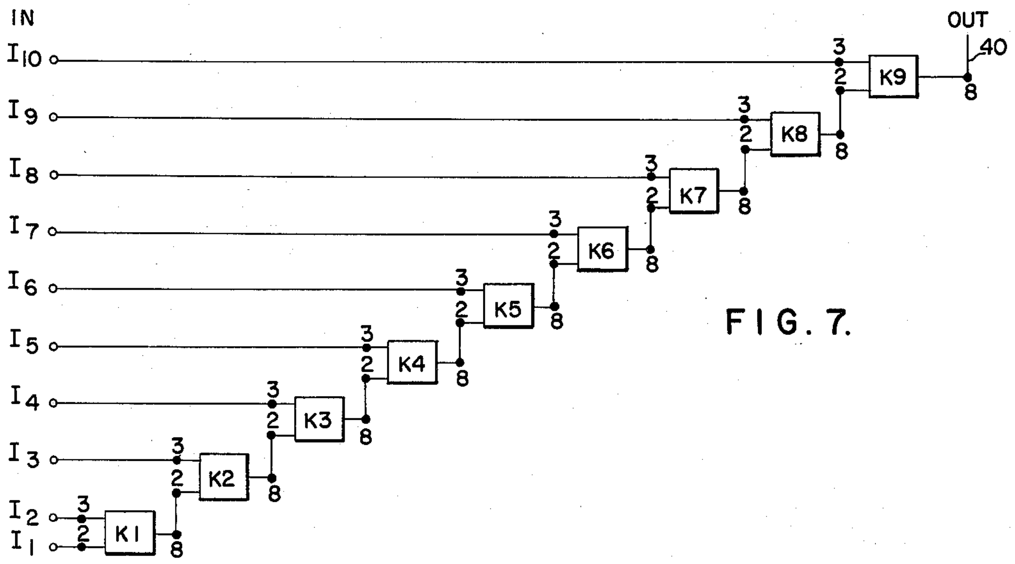
FIGURE 7 is a schematic diagram of the circuit for multiplexing signals in the multiplexer arrangement shown in FIGURE 6.

FIGURE 7 shows the signal switching connections to the relays K1 through K9. This is omitted from FIGURE 6 in order to simplify the drawing as well as the explanation thereof. In FIGURE 6 there is shown a single clock generator 30 supplying its output to drive a flip-flop circuit 32. The output of the flip-flop circuit 32 constitutes alternate outputs C, C′ from the clock generator 30. Effectively the clock generator 30 and flip-flop 32 comprise a two phase clock generator. The output C from the flip-flop circuit 32 is applied to the A input of relay K1. It will be assumed that this relay at the end of a previous operating cycle was last left in its set state. As a result the clock pulse applied to its A input is emitted from its X output and thereafter applied to the set input of the relay K2 to drive it to its set state.

The next clock pulse C′ emitted by the flip-flop circuit 32 is applied to the A input of relay K2. Accordingly, the clock pulse is emitted from the X output of this relay which is connected to the reset input of the relay K1 and to the set input of the relay K3. Relay K1 is driven to its reset state and relay K3 to its set state. The next clock pulse (C) which is applied to the A input of relay K1 is now emitted from its Y output since relay K1 is driven to its reset state. Relay K3, now in its set state will then apply this clock pulse C through its X output to the reset input of relay K2 and to the set input of relay K4.

The next C′ clock pulse will now be applied from the Y output of relay K2 to the A input of relay K4, now in its set state.

Thus, since the X output of relay K4 is connected to the reset input of relay K3 and to the set input of relay K5, the C′ clock pulse resets relay K3 and sets relay K5.

The next clock pulse C which is applied to relay K1 is applied from its Y output now connected to the A input of relay K3, thru its Y output to the A input of relay K5 which is now in its set state. Thus the input of this relay is connected to the X output of this relay. The X output of relay K5 is connected to the reset input of K4 whereby the just applied clock pulse can drive relay K4 to its reset state. The X output of relay K4 is also connected to the set input of relay K6. Thus relay K6 is also driven to its set state.

The next clock pulse C′ which is emitted from flip-flop 32 will thus be transferred through relays K2 and K4 to the X output of relay K6 to be applied thereafter to the reset input of relay K5 and the set input of K7 to drive these relays respectively to their reset and set states.

The next C clock pulse output from the flip-flop 32 is applied through relays K1, K3, K5, and K7 to the X output of relay K7. The X output of relay K7 is connected to drive the relay K6 to its reset state and relay K8 to its set state. The next clock pulse C′ from the flip-flop 32 is applied through relays K2, K4, K6 and the X output of relay K8 to reset relay K7 and to set relay K9. The next clock pulse C is then applied through relay K1, K3, K5, K7 to reset relay K8 and relay K9. The next C′ pulse from the flip-flop 32 is applied through relays K2 to K4, K6 and K8 over the Y output of K8 to said relay K1 thus establish the arrangement condition for a new cycle.

Shown below is a truth table which provides at a glance the sequence of operations of the latching relays K1 through K9 in response to input pulses at intervals $t_0$ through $t_9$. It is believed that the table is self-explanatory wherein 1 represents a relay that is set and 0 represents a relay that is reset.

*Table 1.—Truth Table*

| | K1 | K2 | K3 | K4 | K5 | K6 | K7 | K8 | K9 |
|---|---|---|---|---|---|---|---|---|---|
| $t_0$ | 0 | 0 | 0 | 0 | 0 | 0 | 0 | 0 | 0 |
| $t_1$ | 1 | 0 | 0 | 0 | 0 | 0 | 0 | 0 | 0 |
| $t_2$ | 1 | 1 | 0 | 0 | 0 | 0 | 0 | 0 | 0 |
| $t_3$ | 0 | 1 | 1 | 0 | 0 | 0 | 0 | 0 | 0 |
| $t_4$ | 0 | 0 | 1 | 1 | 0 | 0 | 0 | 0 | 0 |
| $t_5$ | 0 | 0 | 0 | 1 | 1 | 0 | 0 | 0 | 0 |
| $t_6$ | 0 | 0 | 0 | 0 | 1 | 1 | 0 | 0 | 0 |
| $t_7$ | 0 | 0 | 0 | 0 | 0 | 1 | 1 | 0 | 0 |
| $t_8$ | 0 | 0 | 0 | 0 | 0 | 0 | 1 | 1 | 0 |
| $t_9$ | 0 | 0 | 0 | 0 | 0 | 0 | 0 | 1 | 1 |
| $t_0$ | 0 | 0 | 0 | 0 | 0 | 0 | 0 | 0 | 0 |

FIGURE 7 shows the arrangement for making connection to the remaining available terminals of the latching relays K1 through K9 for handling the multiplexing. The designations of the relay terminals are those shown in FIGURE 3. The input terminals are designated by the reference numerals I through I10. Input signal terminals I2 through I10 each connects to a terminal 3 on each different one of the latching relays K1 through K9. The first signal input terminal I1 is connected to terminal 2 on relay K1. The output from each one of the relays respectively K1 through K9 is taken from its terminal 8. The No. 8 terminal of each lower order relay is connected to the No. 2 terminal of a higher order relay. The output from the entire multiplexing arrangement is taken from the No. 8 terminal of the last relay K9 which is connected to an output terminal 40. Therefore, as the relays K1 through K9 sequence in the manner previously described the input signals applied to input terminals I1 through I10 are sequentially applied to the output terminal which is connected to terminal 8 of the relay K9.

Effectively when any one of the magnetic latching relay is in its reset state terminal 3 is connected to terminal 8. Whenever any one of the magnetic latching relays is in its set state then terminal 2 is connected to terminal 8. In accordance with the previous description and succinctly shown in the truth table relays K2 through K9 are in their reset states and relay K1 is in its set state at the beginning. Thus the terminal 2 of relay K1 can be connected through all the relays to the terminal 8 of relay K9. Thereafter as relays K2 through K9 successively sequence from their reset to their set states and back to their reset states they provide a path of contact connections for successively connecting the input terminals I2 through I10 to the output terminal 40 through terminal 8 of relay K9.

It is noteworthy that the arrangement shown in FIGURE 7 is reversible, that is, if it is desired to connect a single input in sequence to a plurality of outputs then the single input can be the output terminal 40. The signals applied thereto will be applied in sequence to the respective signal input terminals.

In an embodiment of the invention which was built, the latching relays which were used were of the type manufactured by Sigma Instrument Company designated as type 32JPD–25 GD–SIL. These are standard adjustment 325 ohm dual coil relays with a plug-in header and silver contacts. This designation of the relay is provided by way of illustration and not to be employed as a limitation upon the invention.

The advantages of the system shown, is that no active or passive electrical components are required in the interconnection of the relays, and further the logical design allows the operation to start from any one of the 502 possible nonoperating states. The relay deck will then assume its correct operating sequence within a frame period. This means that the system does not require additional monitoring and reset circuitry to insure proper operation and turn on after momentary failure of the system. Furthermore, such automatic unfouling is accomplished with no increase in power consumption. Finally, the logical interconnection permits data switch interconnections such that it is virtually impossible to switch more than a single measurement to the common output terminal even in the case of component or wiring failure. Those skilled in the art will readily appreciate how to combine a plurality of the multiplexers of the type shown in this invention to achieve more complicated desired telemetering arrangements, without departing from the scope and spirit of this invention.

There has been accordingly shown and described herein a novel, simple and useful multiplexing arrangement whereby a plurality of signals may be sequentially connected to a single output terminal or a single input terminal may be sequentially connected to a plurality of output terminals.

What is claimed is:

1. Apparatus for sequentially connecting a plurality of signal source terminals to a single output terminal, said apparatus comprising a plurality of latching relays, said latching relays being arranged in a sequence, each said latching relay having a first and second signal input terminal and a signal output terminal, first coil means, excitation of which connects only said first input terminal to said signal output terminal, and second coil means, excitation of which connects only said second signal input terminal to said signal output terminal, means connecting the first and second signal input terminals of a first of said sequence of latching relays to a first and second of said plurality of signal source terminals, means respectively connecting a different one of said remaining signal source terminals to the second signal input terminal of a different one of said sequence of latching relays, means for connecting the output terminal of each one of said relays in said sequence to the first input terminal of a succeeding relay in said sequence, means connecting the output terminal of the last latching relay in said sequence to said single output terminal, and means for applying excitation successively to said sequence of latching relays first to a second coil means of one of said latching relays, then to a second coil means of the next latching relay in said sequence, then to the first coil means of said one of said latching relays to thereby sequentially connect each of said plurality of signal source terminals to said single output terminal.

2. Apparatus as recited in claim 1 wherein said means for applying excitation successively to said sequence of latching relays first to a second coil means of one of said latching relays, then to a second coil means of the next latching relay in said sequence, then to the first coil means of said one of said latching relays to thereby sequentially connect each of said plurality of inputs to said single output terminal includes, for each of said latching relays, an excitation input terminal, a first and second excitation output terminal, and means connecting said excitation input terminal only to said first excitation output terminal upon excitation of said first coil means and only to said second excitation output terminal upon excitation of said second coil means, means connecting each said second excitation output terminal of each odd numbered relay in said relay sequence except the last and next to the last to the excitation input terminal of the next succeeding odd numbered relay in said sequence, means connecting each said second excitation output terminal of each even numbered relay in said relay sequence except the last to the excitation input terminal of the next succeeding even numbered relay in said sequence, means connecting the first excitation output terminal of said first relay in said sequence to the second coil means of said second relay in said series, means connecting the first output excitation terminal of each of the remaining relays in said sequence except the last to the second coil means of an immediately succeeding relay and to the first coil means of an immediately preceding relay in said sequence, means connecting the second excitation output terminal of said next to the last of said odd numbered relays in said sequence to the first coil, means of the last of the even and of the odd relays in said sequence, means connecting the second excitation output terminal of the last of the even numbered relays in said relay sequence to the second coil means of the first of the relays in said sequence, a two phase clock generator, means to apply one phase output of said two phase clock generator to the input excitation terminal of the first relay in said relay sequence and means to apply the other phase output of said two phase clock generator to the input excitation terminal of the second relay in said relay sequence.

3. A relay multiplexer comprising a plurality of latching relays arranged in a numbered sequence, each said latching relay having a first coil means, a second coil means, an input excitation terminal, a first and second output excitation terminal, and means for connecting said input excitation terminal only to said first output excitation terminal when said first coil means is excited and for connecting said input excitation terminal only to said second output excitation terminal when said second coil means is excited, means for operating said latching relays in said numbered sequence, including, means connecting each said second excitation output terminal of each odd numbered relay in said relay sequence except the last and next to last to the excitation input terminal of the next succeeding odd numbered relay in said sequence, means connecting each of said second excitation output terminal of each even numbered relay in said relay sequence except the last to the excitation input terminal of the next succeeding even numbered relay in said sequence, means connecting the first excitation output terminal of said first relay in said sequence to the second coil means of said second relay in said series, means respectively connecting the first output excitation terminal of each of the remaining relays in said sequence except the last to the second coil means of an immediately succeeding relay and to the first coil means of an immediately preceding relay in said sequence, means connecting the second excitation output terminal of said next to the last of said odd numbered relays in said sequence to the first coil means of the last of the even and of the odd relays in said sequence, means connecting the second excitation output terminal of the last of the even numbered relays in said relay sequence to the second coil means of the first of the relays in said sequence, a two phase clock generator, means to apply the one phase output of said two phase clock generator to the input excitation terminal of the first relay in said relay sequence, and means to apply the other phase output of said two phase clock generator to the input excitation terminal of the second relay in said relay sequence.

4. A relay multiplexer comprising a plurality of latching relays in a numbered sequence each having double pole double throw contacts including respectively a first and second common contact, first, second, third and fourth output contacts, a first coil, excitation of which causes said first and second common contacts to respectively be connected to said first and third output contacts, a second coil excitation of which causes said first and second common contacts to be respectively connected to said second and fourth output contacts, means connecting the second common contact of each relay to the third output contact of a succeeding relay in said sequence, and means for applying excitation to the first and second coils of said plurality of latching relays for connecting the common contacts of said relays first to the respective first and third output contacts, then to the respective second and fourth output contacts then to the first and third output contacts again, said means including a two phase clock generator, means for applying one phase output of said clock generator successively to the second coil means of the even numbered relays in said relay sequence thru the double pole double throw contacts of said odd numbered relays in said sequence, and means for applying the other phase output of said clock generator successively to the second coil means of the odd numbered relays in said relay sequence thru the double pole double throw contact of said even numbered relays in said sequence.

5. A relay multiplexer as recited in claim 4 wherein said means for applying one phase output of said clock generator successively to the second coil means of the even numbered relays in said relay sequence thru the double pole double throw contacts of said odd numbered relays in said sequence, and means for applying the other phase output of said clock generator successively to the second coil means of the odd numbered relays if said relay sequence thru the double pole double throw contacts of said even numbered relays in said sequence includes means respectively connecting the second output contact of all odd numbered relays in said sequence except the last and next to the last to the first common contact of the respective succeeding odd numbered relays in said sequence, means respectively connecting the second output contact of all even numbered relays in said sequence except the last to the first common contact of the respective next succeeding even numbered relays in said sequence, means respectively connecting the first output contacts of all the odd numbered relays in said sequence except the first and last to the respective second coil means of a succeeding relay in said sequence and to the respective first coil means of a preceding relay in said sequence, means respectively connecting the first output contacts of all even numbered relays in said sequence to the respective second coil means of a preceding relay in said sequence and to the respective first coil means of a respective first coil means of a succeeding relay in said sequence, means connecting the second output contact of the next to last odd numbered relay in said sequence to the first coil means of said last of the even numbered and last of the odd numbered relays in said sequence, means connecting the first output contact of the first of said odd numbered relays to the second coil means of the first of the even numbered relays, means applying one phase of said clock generator output to the first common terminal of the first relay, and means applying said other phase clock generator output to the first common terminal of second relay.

6. A relay multiplexer comprising a plurality of latching relays arranged in a numbered sequence, each having double pole double throw contacts including a first common contact, first, second output contacts, a first coil, excitation of which causes said first and second common contacts to be connected to said first output contact and a second coil excitation of which causes said first common contacts to be connected to said second output contacts, means for operating said latching relays in said numbered sequence comprising a two phase clock generator, means respectively connecting the second output contact of all odd numbered relays in said sequence except the last and next to the first common contact of the respective succeeding odd numbered relays in said sequence, means respectively connecting the second output contact of all even numbered relays in said sequence except the last to the first common contact of the respective next succeeding even numbered relays in said sequence, means respectively connecting the first output contacts of all the odd numbered relays in said sequence except the first and last to the respective second coil means of a succeeding relay in said sequence and to the respective first coil means of a preceding relay in said sequence, means respectively connecting the first output contacts of all even numbered relays in said sequence to the respective second coil means of a preceding relay in said sequence and to the respective first coil means of a respective first coil means of a succeeding relay in said sequence, means connecting the second output contact of the next to the last odd numbered relay in said sequence to the first coil means of said last of the even numbered and last of the odd numbered relays in said sequence, means connecting the first output contact of the first of said odd numbered relays to the second coil means of the first of the even numbered relays, means applying said clock generator output to the first common terminal of the first relay in said one phase sequence, and means applying said other phase clock generator output to the first common terminal of second relay.

7. The improvement in multiplexing networks of the type wherein a plurality of relays are driven in sequence to sequentially connect a plurality of different signal sources to a single output, said improvement comprising a plurality of latching relays in a numbered sequence each having a set stable state and a reset stable state, and means for driving each relay from its set to its reset stable state and vice versa, each relay having a set of double pole double throw contacts including a first and second common contact, first, second, third and fourth output contacts, said first and second common contacts being respectively connected to said first and third output contacts when said relay is in its reset state and to said second and fourth output contacts when said relay is in its set state, a two phase clock pulse generator, means for applying one phase clock generator output to the first common contact of the first relay in said numbered sequence, means for applying one phase clock generator output to the first common contact of the second relay in said numbered sequence, means interconnecting the first common contacts and first and second output contacts of all said relays to cause sequential operation from set to reset to set stable states of all said relays in said sequence thru the contacts of a preceding relay responsive to output from said two phase clock generator, and means interconnecting the second common contacts and third and fourth output contacts of all said relays to sequentially connect the second output contact of each relay in said numbered sequence to the second common contact of the last relay in said numbered sequence as said relays are driven in sequence to their set stable states.

No references cited.